United States Patent

[11] 3,617,559

| [72] | Inventor | Allen Cywin<br>Alexandria, Va. |
|---|---|---|
| [21] | Appl. No. | 33,455 |
| [22] | Filed | Apr. 30, 1970 |
| [45] | Patented | Nov. 2, 1971 |
| [73] | Assignee | The United States of America as represented by the Secretary of the Interior |

[54] NEUTRALIZATION OF FERROUS IRON-CONTAINING ACID WASTES
8 Claims, 2 Drawing Figs.

[52] U.S. Cl. ......................................... 210/46,
23/200, 210/48, 210/50, 210/53
[51] Int. Cl. ......................................... C02c 5/04
[50] Field of Search ............................. 210/18, 45,
46, 48, 50, 53, 59–61; 23/61, 200

[56] References Cited
UNITED STATES PATENTS

| 785,312 | 3/1905 | Langley ..................... | 210/50 |
| 1,254,009 | 1/1918 | Hughes et al. ............... | 23/61 |
| 1,310,382 | 7/1919 | Auld et al. ................... | 210/45 |
| 1,824,936 | 9/1931 | Travers ....................... | 210/50 X |
| 2,692,229 | 10/1954 | Heise et al. .................. | 210/50 |
| 2,810,633 | 10/1967 | Cooper ........................ | 210/45 X |
| 3,356,609 | 12/1967 | Bruemmer .................... | 210/15 X |
| 3,516,931 | 6/1970 | Birch ........................... | 210/61 X |

FOREIGN PATENTS

| 1,030,265 | 5/1958 | Germany ..................... | 210/50 |

*Primary Examiner*—Michael Rogers
*Attorneys*—Ernest S. Cohen and Roland H. Shubert ABSTRACT: Acid waste waters containing ferrous iron are neutralized using limestone in a finely divided state. Substantial amounts of a mixed valence, hydrous iron oxide sludge are recycled back to the neutralization and aeration steps of the process to produce a dense, easily dewatered sludge having improved handling characteristics.

PATENTED NOV 2 1971 3,617,559

INVENTOR
ALLEN CYWIN

BY Ernest S. Cohen
Roland H. Shubert
ATTORNEYS 3,617,559

NEUTRALIZATION OF FERROUS IRON-CONTAINING ACID WASTES

BACKGROUND OF THE INVENTION

As antipollution standards become increasingly strict, one important problem faced by a number of industries has been the disposal of acid waste waters. To compound the problem, most acid waste waters carry dissolved metal salts; particularly iron salts such as the sulfate and chloride. Typical of such acid wastes are pickle liquors, pickle rinse waters and acid mine drainage waters.

There are three major approaches to disposal; deep well disposal, regeneration and neutralization. Use of deep wells for disposal purposes is dependent upon the local geology and cannot be considered a general solution to the problem. Regeneration is possible in most instances but has seldom proved to be economically feasible. At this time, neutralization is the most practical approach.

In neutralizing acid wastes, there are only two economic options; lime or limestone neutralization and of course combinations of the two. Other alkaline materials, such as those containing sodium, potassium and ammonium, will effectively neutralize acid wastes but they are expensive and often yield soluble salts which are in turn pollutants.

Another problem faced in any neutralization process is the disposal of sludges produced in the neutralization. These sludges, comprising generally hydrous metal oxides, are often bulky and hard to dewater. Ferrous hydroxide, one of the major sludge components produced in most neutralization processes, is particularly bad. It forms a slimy, gelatinous precipitate; slow to settle and hard to filter.

It has been recognized that the volume and characteristics of sludges formed upon neutralization are dependent upon a number of factors. Some of these factors include the choice of alkaline agent, temperature, acid concentration and the oxidation state of dissolved metal salts; particularly iron. For example, the advantages of finely pulverized limestone neutralization of acid mine drainage to produce a low volume, easy settling sludge is set out in Bureau of Mines Report of Investigations No. 7191 (1968). Another detailed report on limestone neutralization of acid mine drainage may be found in the Water Pollution Control Research Series DAST-33, entitled "Studies on Limestone Treatment of Acid Mine Drainage" (1970).

In order to meet water quality standards, it is necessary that effluents discarded into surface waters have a pH above about 6 and be essentially free of heavy metal salts. When neutralizing ferrous iron-containing acid wastes, considerably difficulty is experienced in meeting those standards, especially when using limestone as a neutralizing agent. While ferrric iron will be substantially completely precipitated as the hydrous oxide at a pH of about 4, ferrous iron will remain in solution until a much higher pH is reached. A pH of about 7.5 to 8 is required to complete the precipitation of hydrous ferrous oxide.

When using limestone as a neutralizing agent, carbon dioxide is released; a portion of which remains dissolved in the water to form carbonic acid. Dissolved carbon dioxide limits the pH attainable in limestone neutralization to a level of about 5 to 6. By air stripping carbon dioxide from the neutralized solution in the presence of excess limestone, it is possible to eventually raise the pH to about 8.4 at which point the solution is in equilibrium with carbon dioxide in the air. However, during this stripping step, the remaining soluble ferrous iron is oxidized to the ferric state, thus releasing an additional equivalent of acidity for each equivalent of ferrous iron oxidized. Neutralization of this additional acidity requires additional amounts of base and tends to be a rather slow reaction as well.

SUMMARY OF THE INVENTION

I have found that dilute acid waste waters containing dissolved metal salts, especially iron salts in the ferrous oxidation state, may be neutralized and the metal salts precipitated as hydrous oxides by use of a limestone slurry neutralizing agent to produce a sludge having very desirable handling characteristics. Such waste waters are mixed with at least a stoichiometric amount of limestone to neutralize the free acid and the mixture is then passed to an aeration step where carbon dioxide is stripped and at least partial oxidation of the ferrous iron occurs. Precipitated sludge containing substantial quantities of iron oxides is separated in a subsequent step and a portion of the sludge is recycled back to the mixing and/or aeration steps.

Hence, it is an object of this invention to neutralize iron containing, acid waste waters.

It is a further object of this invention to produce an iron oxide sludge of superior characteristics and high density.

It is a specific object of this invention to provide an improved process for the limestone neutralization of acid mine drainage waters and dilute industrial acid wastes containing dissolved ferrous iron.

DETAILED DESCRIPTION OF THE INVENTION

Figure 1:
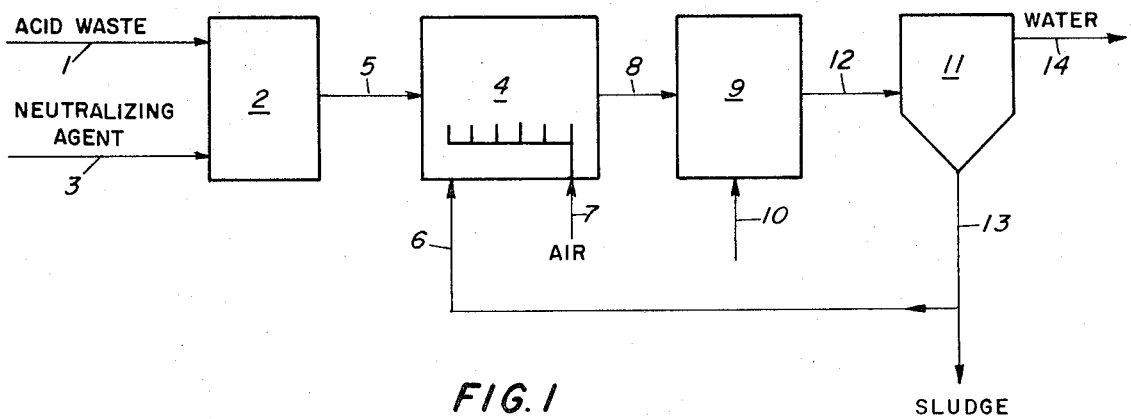
Figure 2:
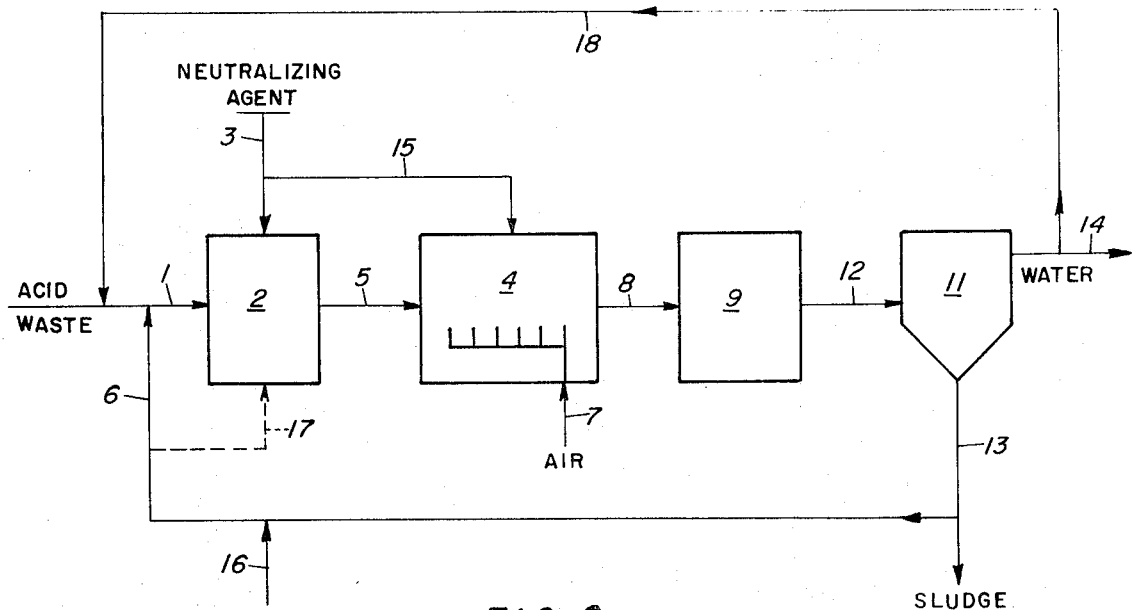

The invention will be more clearly understood by reference to the accompanying drawings in which FIGS. 1 and 2 are diagrammatic flow sheets illustrating variations of my process.

Referring now to FIG. 1, a dilute acid waste stream 1, containing dissolved iron in the ferrous state, is passed into mixer-contactor 2 where at least partial neutralization occurs by reaction with a finely divided limestone-neutralizing agent introduced via conduit 3. Mixer 2 may be of any conventional type which provides thorough mixing and contact between the acid waste and the limestone-neutralizing agent. Dissolved carbon dioxide suppresses the pH level attainable in mixer 2 to a maximum of about 5 to 6. At this pH level, substantial quantities of ferric iron, but little if any ferrous iron are precipitated.

The reaction mix is then passed to aerating vessel 4 by means of conduit 5 where the mix is contacted with substantial quantities of recycled, iron oxide containing sludge from a later clarification step. Recycle sludge, which also contains some unreacted limestone, is introduced into the aerating vessel by means of line 6. Air is introduced into the vessel by means of sparging lines 7.

It is well known to recycle previously precipitated or settled sludge back into a precipitation or reaction vessel in order to inoculate a reaction or furnish precipitation nuclei. Examples of such techniques will be found in many domestic water and sewage-treating processes. My recycle technique differs from those in two respects. First, the iron oxide recycle sludge portion comprises a mixture of ferrous and ferric hydrous oxides. Secondly, the level of sludge recycle is substantially greater than that used or necessary in nucleation and inoculation processes.

Amount of sludge recycled in my process may vary from abut 5 to about 95 percent of total sludge production but it is preferred that recycle be in the range of about 25 to 75 percent of the total. In a preferred embodiment sludge recycle and aeration detention times are adjusted to produce a waste sludge composition at the time of precipitation comprising a mixture of ferrous and ferric oxide corresponding as closely as possible to the ferrous-ferric ratio found in magnetite, or about 1:2. By producing a mixed valence, iron oxide sludge, a number of significant process advantages are achieved. Such a sludge displays superior settling and dewatering characteristics and is of greater density than either a ferrous hydroxide or ferric hydroxide sludge. Less neutralizing agent is required to produce an iron-free-clarified effluent. This follows because during oxidation of ferrous to ferric iron, one equivalent of acidity is produced for each equivalent of iron oxidized. Normal neutralizing processes oxidize substantially all of the ferrous iron to the ferric state. Recycling of substantial quantities of sludge also reduces the conditioning time required to achieve superior sludge characteristics and may increase the capacity of each unit operation of the process. In addition, sludge recycle permits better control of the oxidation rate in the aeration step.

The improved results obtainable with my process appear to stem from a number of theoretical considerations. Recycle of substantial amounts of sludge appears to exert a buffering action on the neutralization and precipitation steps thus enhancing crystal growth. Probably nucleation provided by the sludge recycle contributes to the quality of precipitate produced. Some dissolution of tiny sludge particulates and their subsequent redeposition on larger particles appear to be a factor. When sludge is recycled back to a point prior to or concurrent with limestone adddition, as is preferred, then partial dissolution of the recycled sludge acts to provide better control of the soluble $Fe^{++}/Fe^{+++}$ distribution at the time of percipitation. Finally, physical agglomeration in the aeration step is accentuated because of the high solids level maintained there.

From aerator 4, a stream of neutralized effluent, containing substantial amounts of precipitated solids, is passed via line 8 to flocculation tank 9. There, under the influence of gentle agitation, the suspended sludge solids are agglomerated into larger particles. It is sometimes advantageous to add small quantities of a chemical coagulating aid, such as a liquid polyelectrolyte, to the floc tank via feed conduit 10.

From flocculation tank 9, the suspension of mixed hydrous oxides is passed to clarifying means 11 by way of line 12. Here, a concentrated sludge suspension 13 and a clarified waste water stream 14, suitable for direct stream disposal in most instances, are recovered. Clarifying means 11 may comprise a conventional clarifying vessel, a filter or centrifuge, or may even comprise a settling pond. In any case, sludge suspension 13 is divided into two portions, one of which is recycled back to an early stage of the process via line 6 as has been previously described, and the other fraction is discarded from the process as waste. The waste sludge fraction may be dewatered prior to disposal as by filtration or centrifugation.

Although process performance generally improves as temperature increases, it is preferred to operate at the temperature of the waste water stream. In the case of natural waste waters, such as acid mine drainage, operating temperatures will usually be in the range of about 40° to 90° F. In the case of industrial wastes such as pickle rinse or wash waters, operating temperatures are generally greater, in the range of 100° to 160° F. or even higher.

As an illustration of the benefits produced by my process, a dilute pickle wash water, containing free hydrochloric acid and ferrous chloride, was neutralized in a manner conforming to the flow sheet set out in FIG. 1. Clarifying means 11 comprised a filter. The process was operated both with and without sludge recycle. By recycling sludge in the manner taught, filter capacity increased by about 1 percent based upon wet sludge; by about 30 percent based upon dry sludge and the water content of the filter cake was reduced by 10–15 percent.

Turning now to FIG. 2, there is shown another embodiment of my invention. Those elements of this flow diagram carrying the same numbers as like elements in FIG. 1 are identical thereto. In this second embodiment, sludge recycle line 6 is introduced into acid waste stream 1 rather than into the aeration vessel. A portion of recycle stream 6 may also be passed directly into mixer-contactor 2 by means of conduit 17. Neutralizing agent addition may be split and a portion introduced into the aeration vessel 4 by means of line 15. Additionally, a supplemental source of iron oxide sludge, primarily in the ferric oxidation state, may be introduced into the process from any convenient external source by means of conduit 16. In the case of highly concentrated waste streams, it is advantageous to recycle a portion of clarified waste effluent stream 14 back to feed stream 1 by means of line 18 in order to regulate the concentration of sludge-forming components in the waste stream prior to treatment.

My process is generally applicable to the treatment of natural and industrial acid waste streams which contain significant quantities of ferrous iron. Examples of such waste streams include acid mine drainage waters, steel pickling waste and rinse waters and waste waters derived from metal plating and extraction processes.

What is claimed is:

1. A process for treating dilute acid waste waters which contain ferrous iron consisting of the following sequential steps:
   a. contacting the acid waste water with finely divided limestone in an amount at least sufficient to neutralize all free acid contained in the waste water;
   b. oxidizing at least a part of the ferrous iron contained in the free acid-neutralized waste water to the ferric state by intimate contact with air to produce a sludge containing both ferrous and ferric hydrous oxides:
   c. separating the hydrous ferrous and ferric oxide sludge from the neutralized waste water stream, and
   d. recycling from about 25 to about 75 percent of said separated sludge to again contact said ferrous iron-containing waste stream.

2. The process of claim 1 wherein said sludge recycle rate and the degree of ferrous iron oxidation are controlled to produce an iron oxide sludge having a ferrous to ferric iron ratio of approximately 1:2.

3. The process of claim 2 wherein said recycled sludge is introduced into the oxidation step.

4. The process of claim 2 wherein said recycled sludge is introduced into the contacting step.

5. The process of claim 2 wherein the sludge produced by oxidation is subjected to a flocculation step prior to its separation from the neutralized waste water stream.

6. The process of claim 5 wherein said flocculation step comprises gentle agitation.

7. The process of claim 6 wherein a chemical-coagulating aid is introduced into said flocculation step.

8. The process of claim 2 wherein a portion of the sludge-separated, neutralized waste water stream is mixed with the incoming acid waste water feed stream to regulate the concentration of sludge forming components therein.

* * * * *